United States Patent [19]
Yoon et al.

[11] Patent Number: 5,874,135
[45] Date of Patent: Feb. 23, 1999

[54] DRY-POWDERED, SILICA-COATED PROSPHOR PARTICLES FOR USE IN MANUFACTURING A CRT SCREEN ASSEMBLY, A METHOD OF MANUFACTURING THEM AND A CRT COMPRISING A SCREEN ASSEMBLY MANUFACTURED BY USING THEM

[75] Inventors: Sang Youl Yoon, Kyungsangbuk-do; Ho Seok Shon, Seoul, both of Rep. of Korea

[73] Assignee: Orion Electric Co., Ltd., Kyungsangbuk-do, Rep. of Korea

[21] Appl. No.: 814,253

[22] Filed: Mar. 11, 1997

[51] Int. Cl.$^6$ ........................................................ B05D 5/06
[52] U.S. Cl. .............................. 427/560; 427/64; 427/68; 427/215; 427/221; 427/397.7; 427/407.1
[58] Field of Search ......................... 427/64, 215, 397.7, 427/73, 68, 221, 407.1, 560

[56] References Cited

U.S. PATENT DOCUMENTS

| | | | |
|---|---|---|---|
| 4,287,229 | 9/1981 | Watanabe et al. | 427/64 |
| 4,675,278 | 6/1987 | Sugimoto et al. | 430/523 |
| 4,921,727 | 5/1990 | Datta et al. | 427/64 |
| 4,921,767 | 5/1990 | Datta et al. | 430/23 |
| 4,975,619 | 12/1990 | Datta et al. | 313/466 |
| 5,167,990 | 12/1992 | Tono et al. | 427/215 |
| 5,336,834 | 8/1994 | Zarchy et al. | 585/737 |

*Primary Examiner*—Janyce Bell
*Attorney, Agent, or Firm*—Notaro & Michalos P.C.

[57] ABSTRACT

Dry-powdered, silica-coated phosphor particles for use in manufacturing a CRT screen are dispersively coated with silica particles on the surface thereof to enhance the flow characteristics of the phosphor particles according to the present invention. A method of manufacturing the dry-powdered, silica-coated phosphor particles comprises the steps of sequentially first-dispersing silica particles in methanol, slowly adding dry-powdered phosphor particles to said silica-dispersed methanol, second-dispersing methanol in the silica-dispersed phosphor particles-adding methanol, filtering said resultant methanol of the second-dispersing step, drying the filtered resultant of the filtering step, and sieving the dried resultant of the drying step through a screen.

3 Claims, 3 Drawing Sheets

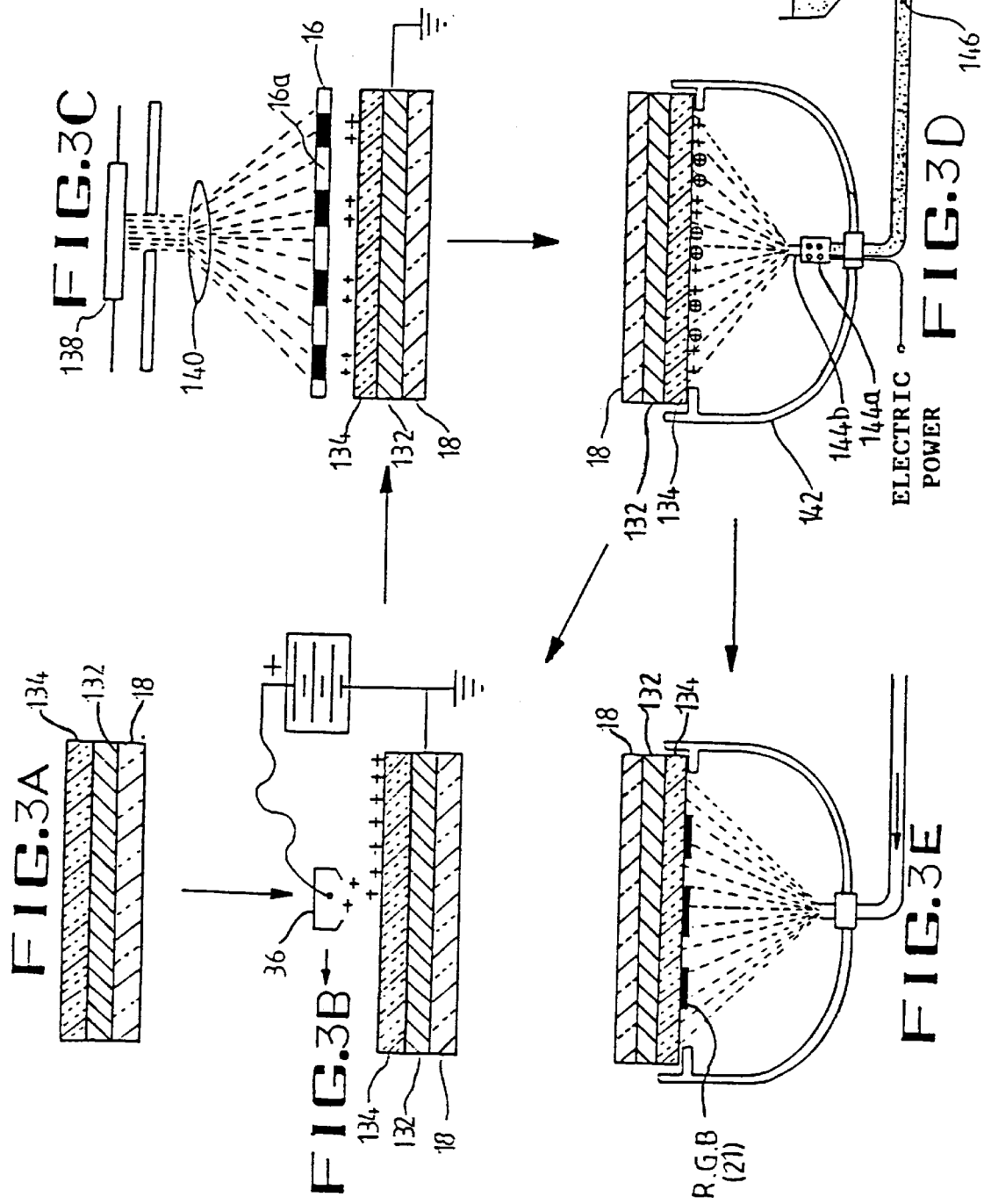

DRY-POWDERED, SILICA-COATED PROSPHOR PARTICLES FOR USE IN MANUFACTURING A CRT SCREEN ASSEMBLY, A METHOD OF MANUFACTURING THEM AND A CRT COMPRISING A SCREEN ASSEMBLY MANUFACTURED BY USING THEM

BACKGROUND OF THE INVENTION

The present invention relates to silica-coated phosphor particles for use in manufacturing a screen assembly for a cathode-ray tube(CRT), and more particularly to dry-powdered, silica-coated phosphor particles having improved flow characteristics thereof, a method of manufacturing the silica-coated phosphor particles and a CRT comprising a screen assembly manufactured by using the silica-coated phosphor particles.

Referring to FIG. 1, a color CRT 10 generally comprises an evacuated glass envelope consisting of a panel 12, a funnel 13 sealed to the panel 12 and a tubular neck 14 connected by the funnel 13, an electron gun 11 centrally mounted within the neck 14 and a shadow mask 16 removably mounted to a sidewall of the panel 12. A three color phosphor screen is formed on the inner surface of a display window or faceplate 18 of the panel 12.

The electron gun 11 generates three electron beams 19a or 19b, said beams being directed along convergent paths through the shadow mask 16 to the screen 20 by means of several lenses of the gun and a high potential applied through an anode button 15 and being deflected by a deflection yoke 17 so as to scan over the screen 20 through apertures or slits 16a formed in the shadow mask 16.

In the color CRT 10, the phosphor screen 20, as shown in FIG. 2, comprises an array of three phosphor elements R, G and B of three different emission colors arranged in a cyclic order of a predetermined structure of multiple-stripe or multiple-dot shape and a matrix of light-absorptive material surrounding the phosphor elements R, G and B.

A thin film of aluminum 22 overlies the screen 20 in order to provide a means for applying the uniform potential to the screen 20, increase the brightness of the phosphor screen and prevent the burning of the phosphor screen due to ions that are produced as the result of a decomposition by collision of gases residing on the tube with the electron beams emitted from the electron gun and the decreasing of the potential of the phosphor screen. And also, a film of resin such as lacquer(not shown) may be applied between the aluminum thin film 22 and the phosphor screen to enhance the flatness and reflectivity of the aluminum thin film 22.

In a photolithographic wet process, which is well known as a prior art process for forming the phosphor screen, a slurry of a photosensitive binder and phosphor particles is coated on the inner surface of the faceplate. It does not meet the higher resolution demands and requires a lot of complicated processing steps and a lot of manufacturing equipments, thereby necessitating a high cost in manufacturing the phosphor screen. And also, it discharges a large quantity of effluent such as waste water, phosphor elements, 6th chrome sensitizer, etc., with the use of a large quantity of clean water.

To solve or alleviate the above problems, the improved process of eletrophotographically manufacturing the phosphor screen by utilizing dry-powdered phosphor particles is developed.

Our copending Korean patent application Serial No. 95-10420 filed on Apr. 29, 1995 and assigned to the assignee of the present invention describes one method of electrophotographically manufacturing the phosphor screen assembly using dry-powdered phosphor particles sprayed through a nozzle from a hopper to the interior surface of the faceplate and charged by a corona charger, as is briefly explained in the following.

FIGS. 3A through 3E schematically show various steps in the above-described manufacturing method. FIG. 3A represents a coating step that forms an electrically conductive layer 132 is formed on the inner surface of the faceplate 18 and overlies an photoconductive layer 134 on the conductive layer 132.

The conductive layer 132, for example, can be formed by conventionally applying a volatilizable organic conductive material consisting of about 1 to 50 weight % of a polyelectrolyte commercially known as Catfloc-c, available from Calgon Co., Pittsburgh, Pa., to the inner surface of the faceplate 18 in an aqueous solution containing about 1 to 50 weight % of 10% poly vinyl alcohol and drying the solution. Said conductive layer 132 serving as an electrode for the overlying photoconductive layer 134. The photoconductive layer 134 is formed by conventionally applying to the conductive layer 132, a novel photoconductive solution containing ultraviolet-sensitive material and by drying it.

The ultraviolet-sensitive material can consist of bis dimethyl phenyl diphenyl butatriene, and one of trinitro fuorenone(TNF), ethylanthraquinone(EAQ) and their mixture. The photoconductive solution is prepared by dissolving 0.01 to 10% by weight of the ultraviolet-sensitive material and 1 to 30% by weight of polystyrene as a polymeric binder in a suitable solvent such as toluene or xylene.

FIG. 3B schematically illustrates a charging step, in which the photoconductive layer 134 is charged to a positive potential of less than 1 Kvolt, preferably above 700 volts by a corona discharger 3b. The charging step does not require a dark environment since the photoconductive layer 134 is sensitive to ultraviolet rays below about 450 nm of wave length.

FIG. 3C schematically shows an exposing step. The shadow mask 16 is inserted in the panel 12 and the positively charged photoconductive layer 134 is selectively exposed through an ultraviolet-transmissive lens system 140 and apertures or slits 16a of the shadow mask 16 to the ultraviolet rays from a ultraviolet lamp 138 with each predetermined incident angle with respect to each aperture or slit 16a. The charges of the exposed areas are discharged through the grounded conductive layer 132 and the charges of the unexposed areas remain in the photoconductive layer 134, thus establishing a latent charge image in a predetermined array structure. This exposing step also does not require a dark environment since the ultraviolet rays are used. Three exposures with three different incident angles of the three electron beams, respectively are required for forming a light-absorptive matrix.

FIG. 3D diagrammatically illustrates the outline of a developing step, in which, after removing the shadow mask 16, suitably charged, dry-powdered particles such as particular color-emitting phosphor particles or light-absorptive material particles are sprayed by compressed air toward a photoconductive layer 134 through a venturi tube 146 and a nozzle 144b from a hopper 148 and attracted to one of the charged or unexposed areas. The discharged or exposed areas depend upon the polarity of the charged particles due to electrical attraction or repulsion, thus one of the two areas is developed in a predetermined array pattern. Below the nozzle 144b, there is provided a discharge electrode 144a such as a corona discharger for charging dry-powdered particles to be sprayed in the nozzle 144b. The light-absorptive material particles for directly developing the unexposed or positively charged areas are negatively charged and the phosphor particles are positively charged for reversely developing the exposed or discharged areas. The charging of the dry-powdered particles may be executed by a triboelectrical charging method disclosed in U.S. Pat. No. 4,921,767 issued to Datta at al. on May 1, 1990 using surface-treated carrier beads.

FIG. 3E schematically illustrates a fixing step using a vapour swelling method. In the fixing step, the surface of the polymers-contained photoconductive layer 134, in which the particles are attracted in a preterminded array, is applied to solvent vapour such as acetone, methyl isobutyl ketone, etc. Then, polymers contained in the photocondustive layer 134 are dissolved and the dry-powdered particles deposited on the developed areas of the photoconductive layer 134 are fixed by an adhesive property of said dissolved polymers.

Turning to FIG. 3D, since the dry-powdered particles should flow from the hopper 148 through the venturi tube to the nozzle 144b and be sprayed at the nozzle 144b toward and over the whole surface of the photoconductive layer 134 by the compressed air in the developing step, an excellent flow characteristic is required on the surfaces of the dry-powdered particles.

However, although the dry-powdered phosphor particles are coated with a polymethyl methacrylate layer and an overlying polyacrylamide layer in order to provide charge characteristics, said coatings do not meet a sufficient fluidity demand in the phosphor particles. Therefore, there is one problem in the above-described process that the phosphor particles adhere to each other and the wall of the hopper 148 or the tube between the hopper 148 and the nozzle 144b. Also, the fluidity problem is caused between the phosphor particles and the carrier beads when they are mixed and generate the triboelectric charge in a developing step described in U.S. Pat. No. 4,921,767, cited above.

It is an object of the present invention to provide silica-coated phosphor particles having an excellent flow characteristics, for use in manufacturing a screen assembly for a CRT.

It is another object of the present invention to provide a method of manufacturing or surface-treating the silica-coated phosphor particles having the excellent flow characteristics.

It is yet another object of the present invention to provide a CRT comprising a screen assembly manufactured by using the above silica-coated phosphor particles.

SUMMARY OF THE INVENTION

In accordance with the present invention, dry-powdered, silica-coated phosphor particles for use in manufacturing a screen assembly for CRT are dispersively coated with silica particles on the surface thereof to enhance the flow characteristics of said phosphor particles.

A method of manufacturing said dry-powdered, silica-coated phosphor particles comprises the steps of: (a) first-dispersing silica particles in methanol; (b) slowly adding dry-powdered phosphor particles to said silica-dispersed methanol; (c) second-dispersing methanol in the silica-dispersed phosphor particles-added methanol; (d) filtering said resultant methanol of the second-dispersing step; (e) drying the filtered resultant of the filtering step; and (f) sieving, through a screen, said dried resultant of the drying step. The resultant dry-powdered, silica-coated phosphor particles are used to manufacturing a luminescent screen assembly for a CRT.

BRIEF DESCRIPTION OF THE DRAWINGS

FIGS. 3A, 3B, 3C, 3D and 3E show a series of steps in electrophotographically manufacturing the screen assembly of the tube according to our copending Korean patent application Serial No. 95-10420 filed on Apr. 29, 1995 and assigned to the assignee of the present invention;

DETAILED DESCRIPTION OF THE PREFERRED EMBODIMENT

Figure 1:
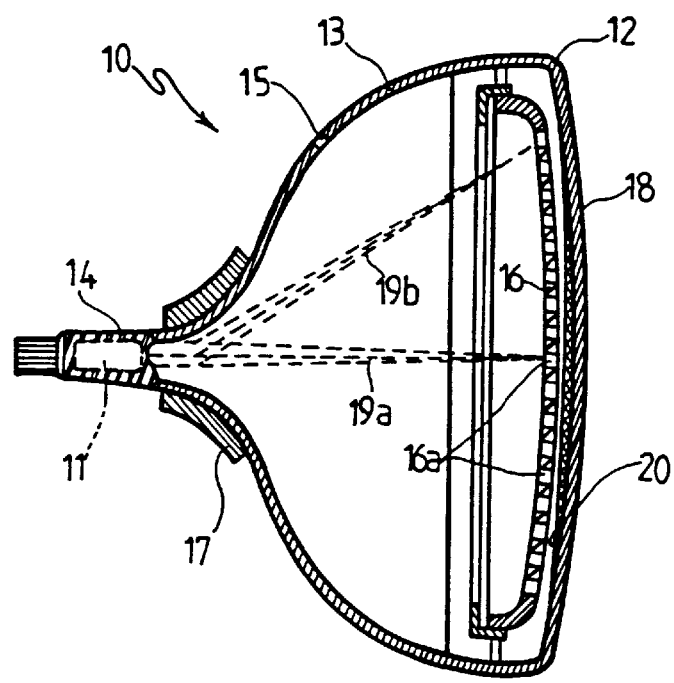
FIG. 1 is a plan view partially in axial section of a color cathode-ray tube.
Figure 2:
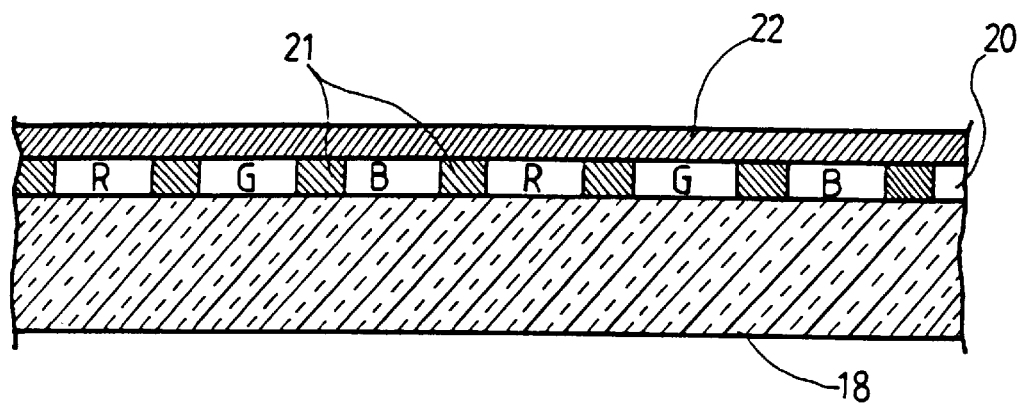
FIG. 2 is a section of a screen assembly of the tube shown in FIG. 1.
Figure 4A:
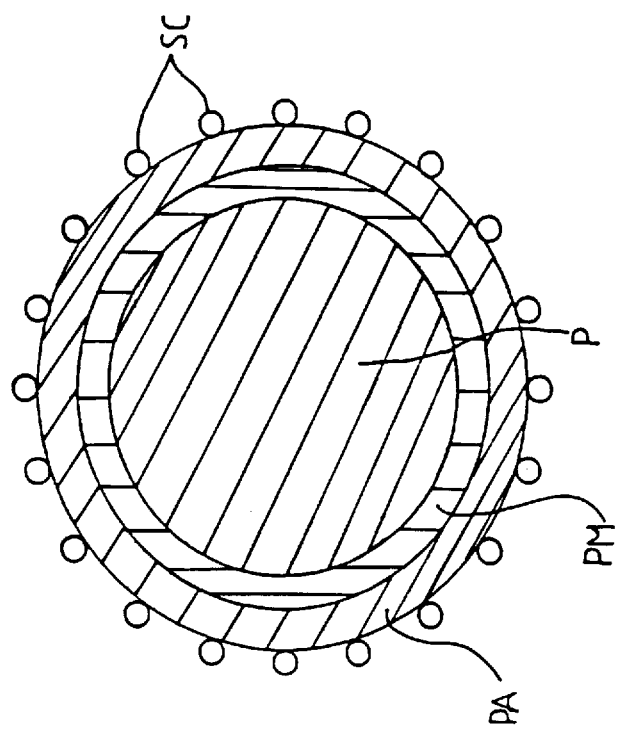
FIG. 4A is an enlarged section of one phosphor particle according to an example of the present invention for electrophotograchically manufacturing the screen.

A silica-coated phosphor particle according to one embodiment of the present invention is schematically shown in FIG. 4A.

The silica-coated phosphor particle is coated with a polymethyl methacrylate layer PM and an overlying polyacrylamide layer PA by a conventional method to provide the electrical charge characteristics on the phosphor particle, and then silica particles are dispersively coated on the overlying polyacrylamide layer PA by a method in accordance with the present invention to enhance the flow characteristics of the particle.

It is desirable that said dispersively-coated silica particles are 0.1 to 0.5 weight % of the phosphor particle because, when the weight of the dispersively-coated silica particles is below 0.1 weight % of the phosphor particle the cohesion of the phosphor particles is still stronger than the slippery force therebetween, and because when the weight of the dispersively-coated silica particles is above 0.5 weight % of the phosphor particle, it causes the chargibility and the density of the phosphor particles attached to the screen to be low, thus affecting the brightness of the screen.

The silica-coated phosphor particles are manufactured by the following method.

Initially, 1 to 5 grams of silica particles are dispersed in one liter of methanol by conventional mixing method and preferably ultrasonic waves. Then, 1 kilogram of dry-powdered phosphor particles are slowly added into the silica-dispersed methanol. Preferably, the dry-powdered phosphor particles are coated with a polymethyl methacrylate or its equivalent PM and an overlying polyacrylamide or its equivalent PA for use in electrophotographically manufacturing the screen.

After said phosphor particles are added, 0.5 liter of methanol is secondly dispersed into the resultant phosphor particles-added, silica-dispersed methanol by the conventional mixing method and preferably by ultrasonic waves. And then, the desired phosphor particles are filtered from the resultant mixture through the conventional filter and preferably through the glass frit filter, dried at the temperature of 60 to 80 degrees centigrade for 2 to 3 hours and then sieved through a 400 mesh screen. The resultant dry-powdered phosphor particles have silica particles SC dispersively coated on the overlying polyacrylamide layer PA, as shown in FIG. 4A. The desirably silica-coated, dry-powdered phosphor particles obtained by the above-described manufacturing method are used in the developing step in the electrophotograhic process of manufacturing a phosphor screen assembly as described in relation to FIGS. 3A to 3E.

Since the resultant dry-powdered, silica-coated phosphor particles have the excellent flow characteristics due to the slippery nature of the silica particles, the cohesion phenomena of the phosphor particles as described in the above as one problem of the electrophotographic process is almost removed, Accordingly, the phosphor particles do not adhere to each other and the wall of the hopper 148 or the tube between the hopper 148 and the nozzle 144*b* during the develop step.

Figure 4B:
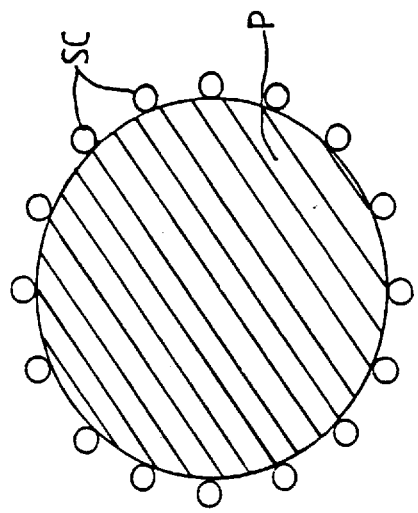
FIG. 4B is an enlarged section of one phosphor particle constituting a completed phosphor screen assembly made using phosphor particles of FIG. 4A.

After the screen is formed using said resultant phosphor particles by the method described in relation to FIGS. 3A to 3E, a spray film of lacquer is applied to the screen and then an aluminum thin film is vapour-deposited onto the lacquer film, as is known in the art. The screen is baked at a high temperature, as is known in the art and then the volatilizable constituents of the screen including the conductive layer 132, the photoconductive layer 134, the polymethyl methacrylate layer PM, the polyacrylamide layer and the remaining solvents are driven off, thus the coloress transparent silica particles SC dispersively remaining on the surfaces of the phosphor particles as shown in FIG. 4B.

In the developing step described in U.S. Pat. No. 4,921, 767, cited above, the present phosphor particles can be easily mixed with the carrier beads and easily expelled from the developer due to their excellent flow characteristics.

It should be clear to one skilled in the art that the present phosphor particles can be used for electrophotographically manufacturing the screen by the method as described in U.S. Pat. No. 4,921,767 and can also be used in the conventional wet process, and that the present process for obtaining the phosphor particles with the flow characteristics can be modified within the scope of the present invention.

What is claimed is:

1. A method of manufacturing dry-powdered, silica-coated phosphor particles for use in manufacturing a CRT screen, said method comprising the steps of:

(a) first-dispersing silica particles in methanol;

(b) adding dry-powdered phosphor particles to said silica-dispersed methanol;

(c) second-dispersing methanol in the silica-dispersed phosphor particles-added methanol;

(d) filtering phosphor particles from said resultant methanol of the second-dispersing step;

(e) drying the filtered particles of the filtering step; and (f) sieving, through a screen, said dried resultant of the drying step.

2. The method of manufacturing dry-powdered, silica-coated phosphor particles as in claim 1, wherein:

said first-dispersing step and said second-dispersing step are performed by ultrasonic waves;

said filtering step is performed using a glass frit filter; and said drying step is performed below 100 degrees centigrade for about 3 to 5 hours.

3. The method of manufacturing dry-powdered, silica-coated phosphor particles as in claim 1, wherein said phosphor particles to be added in the adding step(b) are ones coated with a polymethyl methacrylate layer and an overlying polyacrylamide layer respectively.

* * * * *